July 30, 1935.  A. J. OTTO  2,009,674
TEMPERATURE REGULATION
Filed May 26, 1933  2 Sheets-Sheet 1
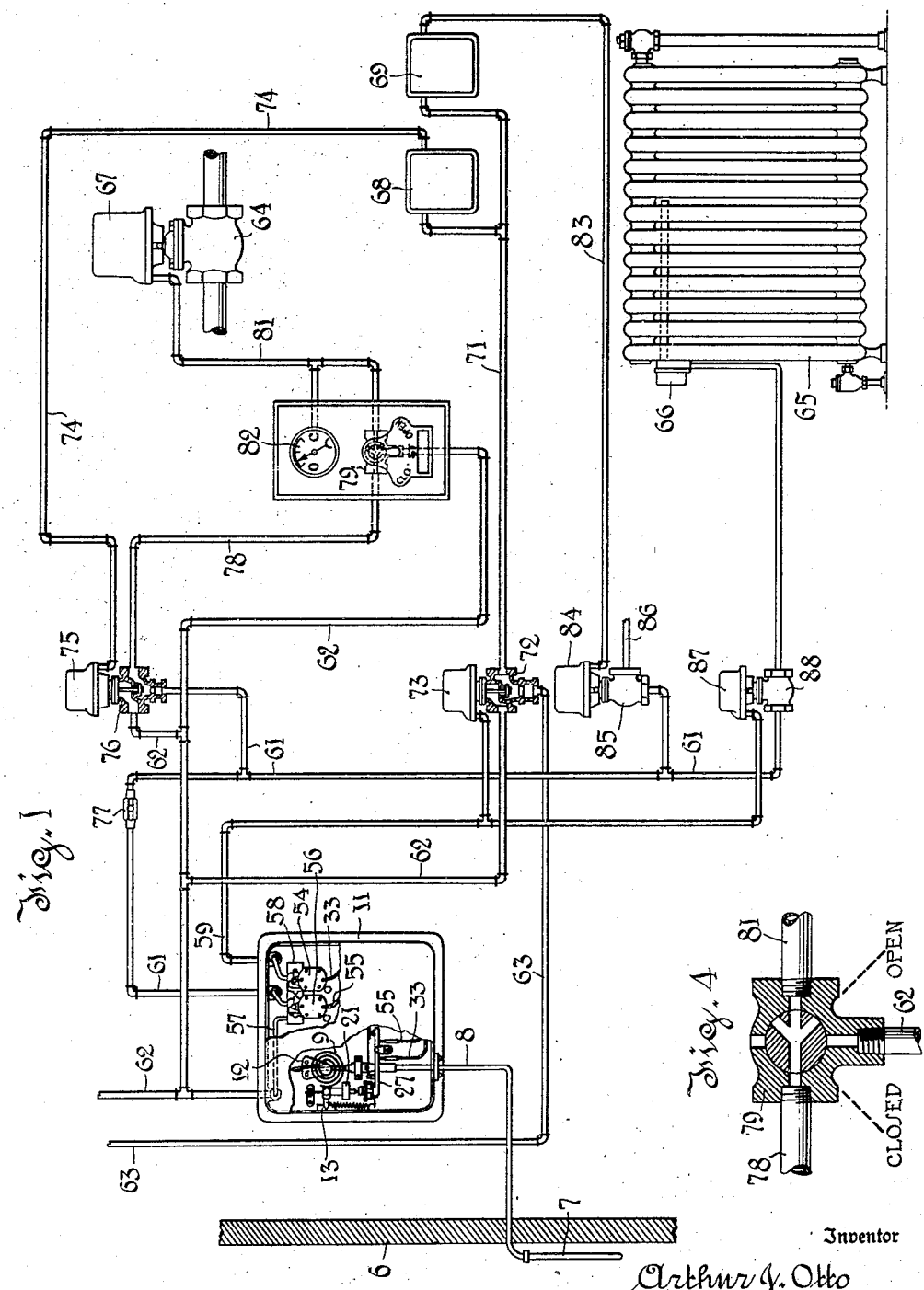
Inventor
Arthur J. Otto July 30, 1935.  A. J. OTTO  2,009,674
TEMPERATURE REGULATION
Filed May 26, 1933  2 Sheets-Sheet 2
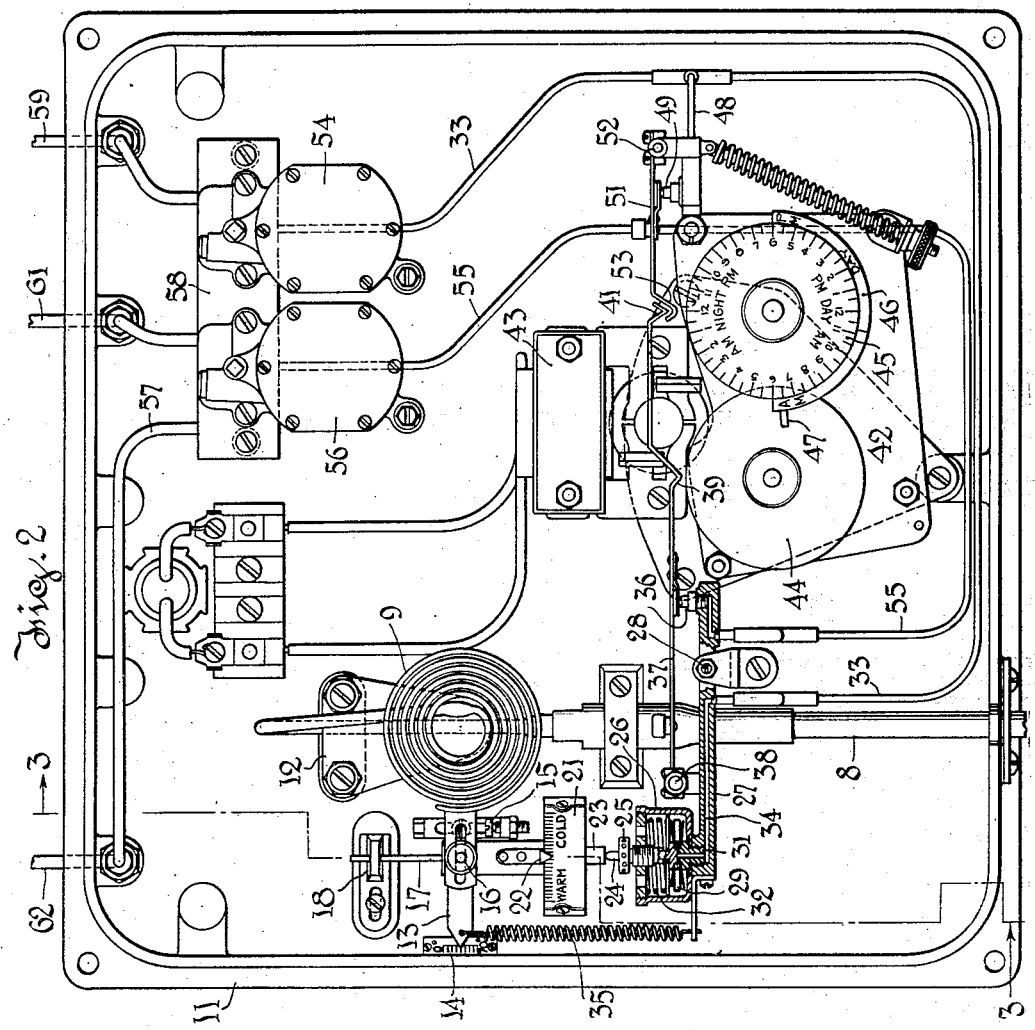
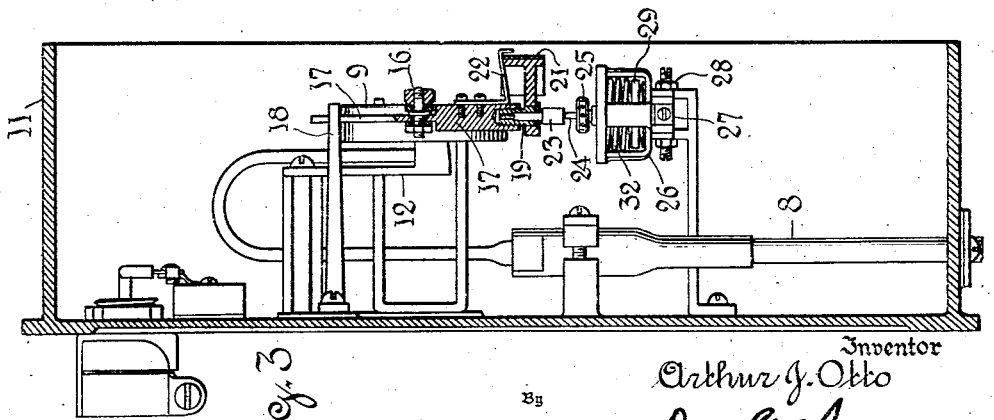
Inventor
Arthur J. Otto
By
Dodge and Sons
Attorneys Patented July 30, 1935

2,009,674

UNITED STATES PATENT OFFICE 2,009,674

TEMPERATURE REGULATION

Arthur J. Otto, Milwaukee, Wis., assignor to Johnson Service Company, Milwaukee, Wis., a corporation of Wisconsin Application May 26, 1933, Serial No. 673,064

14 Claims. (Cl. 236—91)

This invention relates to temperature regulation and involves the feature of temperature control in response to outdoor conditions.

Probably the most satisfactory way of regulating temperature automatically is to subject the heating unit for each room to control by a thermostat or other responsive device subject to conditions in the room. Installations of this sort are necessarily expensive because of the duplication of control apparatus in each room, and many efforts have been made to exercise control of larger units by single thermostatic installations. From this effort have developed so called zone systems in which a building is subdivided into zones or units, each of which zones is subject to substantially uniform conditions of exposure and other factors controlling the demand for artificial heat. Thus each zone is equipped with a control mechanism designed to regulate the conditions in that zone.

The present invention contemplates a zone system in which the supply of heat to the zone is determined primarily by thermostatic means subject to outside temperature. The rate of supply of heat is controlled by varying the length of, and consequently the intervals between, periods of supply of heat.

A system of this sort can be made to give good regulation, provided the zones are well selected, and provided response of the control mechanism to variations of outside temperature, is properly coordinated.

As ancillary features, tending to better regulation, the invention contemplates the inclusion, at some suitable point in each zone, of a maximum temperature thermostat and a minimum temperature thermostat which will take control of the zone valve and hold it closed or open continuously regardless of the action of the cycling mechanism if the temperature passes outside the limits set by such maximum and minimum thermostats.

A further refinement of the invention contemplates that these maximum and minimum thermostats be of the dual type and arranged to establish different maxima and minima under day and night conditions.

A further refinement of the invention contemplates the association with the system, either with or without the maximum and minimum thermostats above mentioned, of a minimum temperature thermostat associated with one heating unit, such as one radiator, and functioning to keep that radiator from falling below a definite minimum temperature.

A further refinement of the invention contemplates means for rendering such minimum thermostat active only under day conditions.

Another refinement of the invention contemplates manual means which may be set to hold the zone valve open continuously or closed continuously, as the operator may desire.

For purposes of explanation only, the invention will be described as embodied with all the features above mentioned in a pneumatic leak port system. A pneumatic leak port system is peculiarly adaptable to this use, because supervisory controls can be so readily imposed on the primary controls, but the invention can be embodied with other types of thermostats, notably electrical, and except as specified in the claims, the invention is not limited to pneumatic systems.

Furthermore, while the heating means has been above described as a zone valve, and the zone valve will be illustrated as a valve controlling the flow of heating medium, for example, steam, it is possible to exercise cycling controls on various heating media, for example, the flow of fuel to a burner may be controlled, or the flow of electric energy to a resistance heating unit may be controlled, so that broadly considered, we are concerned with the intermittent supply of heat energy to the system, irrespective of the nature of that heat energy, and irrespective of whether the control is primary, as, for example, by controlling the generation of heat of combustion, or secondary, by controlling the flow of a heating medium, such as steam, hot water, hot air or electricity. Consequently, the zone valve hereinafter disclosed, is illustrative of any heat energy controlling means.

In the drawings, a preferred embodiment of the invention, including the use of a steam control zone valve and a pneumatic thermostat of the leak port type, is illustrated. Only one zone is shown, and in that zone only a single heating unit, (radiator) to which the minimum control is applied, is illustrated, it being understood that the zone valve supplies steam to a plurality of radiators.

In the drawings:

Fig. 1 is a diagrammatic elevation of the equipment for one zone.

Fig. 2 is a front elevation of the zone thermostat with the cover removed and certain parts sectioned.

Fig. 3 is a section on the line 3—3 of Fig. 2.

Fig. 4 is a diagrammatic section of the manually operated valve in "automatic" position.

Referring first to Fig. 1, a wall of the building is indicated at 6 and a thermometric bulb outside the building is indicated at 7. This bulb may conveniently be of the mercury type and reacts through a pressure transmitting tube 8 upon a Bourdon tube 9 forming part of the automatic control mechanism, which is best shown in Figs. 2 and 3.

The control mechanism is mounted in a case 11 which is shown in the drawings without its front cover (commonly of glass). The Bourdon tube 9 is supported at its center by a bracket 12 carried by the back of the case 11, and rotates counterclockwise on rise of outdoor temperature. The outer, free end of the Bourdon tube carries an arm 13 which serves as a pointer coacting with the graduated scale 14 to indicate outdoor temperature. The graduations run from 0° F. to 70° F. and an adjustable limit stop 15 limits the counterclockwise motion of arm 13.

The arm 13 has a radially adjustable pivot connection 16 with the thrust rod 17 which is longitudinally slidable in a laterally adjustable guide 18. The thrust rod 17 is adjustable in length by means of stem 19 (see Fig. 3) threaded into its lower end, the stem 19 carrying an arcuate dial 21 which by coaction with the combined friction detent and pointer 22 permits a graduated adjustment. A secondary adjustment used merely to "zero" the instrument is afforded by screw 23 threaded into stem 19.

The thrust rod 17 reacts in thrust through screw 23 upon the end of stem 24 which is guided in the adjustable stop sleeve 25 threaded in the cap of housing 26. Housing 26 is mounted on the tilting arm 27 which is fulcrumed at 28 on a bracket carried by case 11. Mounted in housing 26 is an expansible cell or metal bellows 29 carried by nipple 31 threaded into the end of lever 27, and carrying the stem 24. The cell 29 is urged in a collapsing direction by a coil compression spring 32, and motion in a collapsing direction is limited by collision of stem 24 with nipple 31. The bellows is distended at times by pressure fluid admitted through flexible tube 33 and port 34, which last is formed in lever 27. When distended motion of stem 24 is limited by sleeve 25, which is threaded and hence adjustable as to its stop function.

The arm 27 and the arm 13 are drawn together by the coil tension spring 35 so that arm 27 is tilted by variations in outdoor temperature which affect the bulb 7. Manual adjustment of the relation between bulb 7 and arm 27 is effected by swinging dial 21. The cell 29 is controlled by a clock mechanism to effect periodic shifts between a day setting and a night setting. Adjustment of sleeve 25 determines the temperature difference between such settings.

The tilting arm 27 carries a leak port 36 controlled by a valve lid 37 hinged at 38 to arm 27. The lid tends normally to close the leak port 36 but is lifted periodically by clock driven cams, hereinafter described, such cams coacting with follower noses 39 and 41 formed on the lid.

Mounted in case 11 is a frame 42 which carries any suitable clock mechanism, here shown as a synchronous electric motor clock 43. This clock drives an eccentric cam 44 and a program dial 45 through gear trains (not illustrated since they are of conventional form). The train driving the eccentric cam 44 preferably but not necessarily comprises interchangeable gears to permit selection of various desirable ratios, so that the cam can be driven at various speeds from say 1 turn in 5 minutes to 1 turn in 30 minutes. This permits a standardized device to be adapted to various installations, but the period will not ordinarily be changed after satisfactory conditions have been established.

The program dial 45 might make one turn in any desired period, but is indicated as making one turn in 24 hours. Hence it has a day segment or cam 46 made up of two angularly adjustable parts to set it for time and duration of operation. The parts which make up the cam are also interchangeable. The day cam or segment 46 is thus adapted to establish day (normal temperature) periods of any desired duration. Such details are common in the program clock art and are subject to variation in the light of that art.

The segment 46 carries at its leading end a pin 47, called the warming-up cam, which engages nose 41 on lid 37 and lifts the lid continuously for a substantial period to give accelerated heating at the commencement of the day period. At all other times the lid 37 is lifted periodically by eccentric cam 44. The heat is turned on only when lid 37 opens leak port 36 and the duration of the open periods is affected by the angular position of arm 27 which determines the position of the leak port. The angular position of the arm is determined primarily by the temperature at bulb 7, but is subject to a modifying control exerted by program dial 45 through the expansible cell 29.

To effect this modifying control the tube 33 leads from cell 29 by way of branch 48 to a leak port 49. This is controlled by a valve lid 51, pivoted at 52 and having a follower nose 53 in the path of day segment 46. For day conditions port 49 is opened by lid 51 so that cell 29 is vented and collapses.

Tube 33 is connected to a progressive relay 54 and leak port 36 is connected by flexible tube 55 with a progressive relay 56. These relays may be of any type in which leak ports, such as 36 and 49 exert a controlling action such that the relays, receiving pressure from a supply line 57 through manifold mount 58, act to establish in respective branch lines 59 and 61, pressures which vary in direct relation to the venting action of respective leak ports.

Since the pressures in the branch lines vary directly with the pressures established by the leak ports, the use of relays is not strictly necessary, but such use is desirable since the relay secures rapid pressure response in the branch lines. The possibility of using leak ports both with and without relays is well understood in the art.

In the drawings are indicated relays 54 and 56 constructed according to the Otto Patent 1,500,260, July 8, 1924. The supply line 57 supplies pressure to the ports 6 of the Otto patent, the leak ports 36 and 49 are connected similarly to the leak port 30 of the patent. The branch lines 59 and 61 lead from the branch port 9 of the patent. In the present device the leak ports are controlled by the lids 37 and 51 and these take the place of the thermostatic bar 32 and valve plate 31 shown in the patent.

Refer now to Fig. 1.

The supply line 57 is a branch from a supply line 62 operating at a definite pressure, assumed to be 17 pounds per square inch gage. There is also a supply line 63 operating at a different pressure assumed to be 13 pounds gage.

The zone valve 64 controls the supply of heat to the entire regulated zone. It is here shown as a steam valve controlling flow to all the radiators in the zone, only one of which is indicated at 65. This particular radiator is provided with a minimum limiting thermostat 66 and is illustrated to bring out the functions of that limiting thermostat. The zone valve 64 is normally held open by a spring and closes when pressure is admitted to a bellows motor 67 of familiar form.

At suitable places in the heated zone are two room thermostats, the first of which is a maximum temperature thermostat 68, and the second of which is a minimum thermostat 69. These thermostats are not necessarily located at the same place, though they are indicated adjacent each other in Fig. 1. The maximum thermostat 68 is so located as to exert a satisfactory supervisory control over the maximum temperature in the zone. The minimum thermostat 69 is so located as to exercise a satisfactory supervisory control over the minimum temperature in the zone.

These two thermostats are of the so-called "Dual" type, a typical example of which is illustrated in the Fortier Patent 1,597,350, August 24, 1926. While that patent describes a system in which high supply pressure establishes day temperature, and low supply pressure establishes night temperature, it is obvious that this relation can be reversed and such reversed relation is adopted in the present case.

The thermostats are of the pneumatic type and are supplied with air through a supply line 71. Means are provided to change the pressure of the air in the supply line and the thermostats 68 and 69 respond to this change of pressure, so that each establishes two characteristically different temperatures. These temperatures are individually adjustable.

The thermostat 66 functions to establish temperature minimum at one of the radiators. In some installations this is not necessary, but the purpose of the diagram is to illustrate the possibility of such a control.

The supply lines 62 and 63 are connected to two ports of a three-way valve 72, to the third port of which is connected the supply line 71 for the thermostats 68 and 69. The valve 72 is biased by a spring (not shown) so it tends to assume a position in which the low pressure line 63 is connected to the supply line 71. This is day condition, it being understood that low pressure on the line 71 conditions the thermostats 68 and 69 to maintain their higher day settings.

The valve is actuated by a bellows motor 73 which functions when subject to pressure to shift the valve 72 and connect the high pressure line to supply the line 71. (This produces the night, low temperature, adjustments of the thermostats 68 and 69).

The branch line 74, pressure in which is controlled by the thermostat 68, is connected to the bellows motor 75 of a three-way valve 76. One port of this valve is connected to the high pressure line 62. The second port of the valve 76 is connected to the branch line 61 from relay 56, there being an adjustable throttling restriction 77 interposed in the line between the relay 56, as indicated. The third connection of the three-way valve 76 is connected to line 78, which leads to one terminal of manually operated four-way valve 79.

When the motor 75 is inert, a biasing spring (not shown) shifts the three-way valve 76, so that line 61 is connected to line 78. When the motor 75 is subject to pressure, the valve 76 connects the high pressure line 62 with the line 78.

Four-way valve 79 has connections with the high pressure line 62 and a connection with the branch line 81 leading to the motor 67 of the zone valve. In the normal "automatic" position of four-way valve 79 shown in Figs. 1 and 4, the lines 78 and 81 are directly connected. In the position marked "Closed", the high pressure line 62 is connected directly with the motor 67 of the zone valve and holds the zone valve closed. In the position of the four-way valve marked "Open", the branch 81 is connected directly to atmosphere and the connections 62 and 78 are blanked so that the motor 67 is vented and the zone valve 64 is permitted to remain open continuously. A pressure gage 82 connected to the branch line 81 serves to indicate the pressure in motor 67 and consequently the condition of the zone valve 64.

The branch line 83, in which pressure is controlled by thermostat 69, leads to a bellows motor 84 which, when subject to pressures, holds vent valve 85 closed. The valve is biased in an opening direction by a spring (not shown) and when opened vents the line 61 to atmosphere. Valve 85 is shown in Fig. 1 as connected directly to line 61 and the atmospheric vent connection is indicated at 86.

The line 59, in addition to its connection with the motor 73, is connected with the motor 87 of a valve 88, the valve being interposed between the line 61 and the minimum temperature thermostat 66 already described as associated with radiator 65. When the motor 87 is subject to pressure, the valve 88 is held closed. When the motor 87 is vented, the valve 88 opens.

The thermostat 66 is a leak port thermostat which functions on fall of temperature to open its leak port. By tracing the connections it will be observed that, unless either the motor 87 or the motor 75 is energized, the opening of the leak port of thermostat 66 will serve to vent the motor 67 of the zone valve. The capacity of the restricting valve 77 is adjusted to a value less than the maximum venting capacity of the leak port of the thermostat 66. Consequently if the radiator falls below the temperature determined by the thermostat 66, the zone valve 64 will be opened sufficiently to maintain the temperature of the radiator.

*Operation*

In the operation of the device, assume that the clock is running. The parts are so arranged that, when temperature outside is seventy degrees (70°), the tilting lever 27 will be so positioned that lid 37 is not lifted from leak port 36 by cam 44. When outside temperature is zero, lever 27 will be positioned so that lid 37 is lifted from leak port 36 substantially continuously by the cam 44. This assumes that the cell 29 is in its normal deflated condition. It is also assumed that the heating surface is so proportioned that under each of the limiting conditions above set forth the zone will be satisfactorily heated by steam fed through the zone valve 64.

Minor adjustments of the action can be made by adjusting the dial 21. The initial zeroing adjustment is made by adjusting screw 23. Under day conditions the rotation of cam 44 will result in periodic lifting of the lid 37, but the duration of the period during which the lid 37 is lifted clear of the leak port 36 will depend on the position of the leak port 36 and consequently on the position of the lever 27. The position of the lever 27 is determined by the temperature affecting outdoor bulb 7.

Under day conditions the sector 46 will lift the lid 51 so that leak port 49 is open and cell 29 collapses, and under night conditions, the sector will free the lid so that the leak port 49 is closed and cell 29 will be distended.

Under day conditions line 59 is vented by the opening of leak port 49 so that motor 73 is vented and line 71 is supplied at the relatively low pressure of thirteen (13) pounds by line 63. This conditions the thermostats 68 and 69 to maintain the relatively high maximum and minimum temperatures suited for day operation.

The venting of the line 59 also permits the valve 88 to open so that the minimum thermostat 66 is operative. The opening and closing of the leak port 36 as a result of the rotation of cam 44 causes the relay 56 to function to admit and then exhaust pressure fluid to and from the line 61.

Assuming that the valve 79 is in normal position, as shown in Fig. 1, the effect is to admit and exhaust pressure fluid to and from motor 67, alternately closing and opening the valve 64. These cycles repeat at uniformly recurring intervals, but the open period is varied with relation to the closed period, being longer when outdoor temperature is low than when outdoor temperature is high. In this way the rate of supply of heat to all the radiators in the zone is controlled primarily in accordance with outside temperature. However, if the room temperature affecting thermostat 68 exceeds the desired maximum, the thermostat will function to admit pressure fluid to the line 74, thus energizing motor 75 and disconnecting the motor 67 from the line 61 and connecting it to the high pressure supply line 62. It follows that the zone valve 64 will be held continuously closed until room temperature falls below the desired maximum.

On the other hand, if room temperature falls below the desired minimum, the thermostat 69 will admit the pressure fluid to the line 83, and, by energizing the motor 84, will open the valve 85 and vent the line 61 to atmosphere, deenergizing the motor 67 and causing the zone valve 64 to remain continuously open until the room temperature rises above the minimum determined by the thermostat 69. If at any time the temperature of the radiator 65 falls below the minimum determined by thermostat 66, this thermostat will function to vent the line 61, and, by impairing the energization of the motor 67, will increase the supply of heat to radiator 65 and all radiators supplied by the valve 64.

Under night conditions the lid 51 will close the leak port 49. This will result in establishment of pressure in the line 33 which will distend the cell 29 and change the position of the tilting lever 27. If it is desired to maintain a zone temperature of fifty degrees (50°) at night, instead of seventy (70°) contemplated for day the stop 25 will be adjusted to limit the distention of cell 29 to an appropriate amount.

The closing of the leak port 49 acts through the relay 54 to establish pressure in the line 59 and to energize the motors 87 and 73. The motor 87 closes the valve 88 and renders the thermostat 66 inoperative. The motor 73 shifts the three-way valve 72 and subjects the supply line 71 of the limiting thermostats 68 and 69 to the high pressure in line 62 so that these thermostats now function to maintain a lower minimum and a lower maximum temperature in the heated zone. Thermostats 68 and 69 function at night in the manner described for their day operation, but they function to maintain lower temperatures, appropriate to the changed position of the tilting lever 27.

The engineer can take control of the zone valve 64 at any time. When valve 79 is in the mid position shown in Fig. 1, automatic control exists, and if it is desired to close the control valve 64, the valve 79 is shifted to "closed" position in which air from supply line 62 acts continuously on motor 67 and holds the valve closed so that no heat is supplied. If it is desired to have heat supplied continuously, the valve 79 is shifted to "open" position in which the motor 67 is vented.

If the system has been operating to maintain a night temperature of fifty degrees (50°), it requires more than the normal supply of heat to bring the building rapidly to day temperature, and this is the function of the heating-up cam 47 already mentioned. At or about the time that the day sector 46 engages the nose 53 on lid 51, the heating up cam 47 engages the nose 41 on lid 37 and lifts this so as to hold the leak port 36 open continuously. The continuous venting of the relay 56 results in continuous venting of the line 61 so that the motor 67 is deenergized and the zone valve 64 remains continuously open. This condition persists as long as the lid 37 is held elevated by cam 47.

During this period, however, the maximum thermostat 68 will take control under the day temperature setting to prevent overheating of the heated space. If overheating occurs, thermostat 68 will close the zone valve 64 continuously as long as overheating continues. Consequently, when heating-up cam 47 ceases to act, the heated space will be approximately at normal temperature and the cam 44 can take control to maintain normal conditions.

While the apparatus has been described in considerable detail, the fact is recognized that the invention resides in the principles of intermittent control with supervisory maximum and minimum controls in the room and with supervisory control of the minimum temperature of the heating unit. Such control may be had in other ways. Consider, for example, the coaction of the lid 37 with the leak port 36. When they contact leakage flow is stopped. When they are separated leakage flow is permitted. Consequently even in the pneumatic embodiment illustrated and described, control is effected by bringing a contactor element into and out of engagement with a contact. The same is true of the lid 51 and leak port 49.

The zone valve 64 is shown as arranged to close tight and thus terminate the supply of heat both between cycles during normal operation, and also when actuated by the maximum temperature thermostat. This is the preferred arrangement, but it should be recognized that complete closure is not strictly necessary. Obviously, if closure so reduces the supply of heat that the amount of heat supplied is negligible for practical purposes, the objects of the invention will be attained.

What is claimed is,—

1. The method of heating an enclosed space, which consists in supplying heating medium continuously to heat the space when the temperature in the space is below a definite minimum value; suspending at least substantially the supply of heating medium when the temperature in the space is above a desired maximum; when the temperature in said space is between said maximum and minimum, supplying heating medium in recurrent periods of variable duration; and controlling the duration of such recurrent periods according to outside temperature.

2. The method of heating an enclosed space, which consists in supplying heating medium continuously to a heat exchange surface when temperature in the space is below a desired minimum; suspending at least substantially the supply of heating medium when the temperature in the space is above a desired maximum; when the temperature in the space is between said maximum and minimum, supplying heating medium in recurrent periods of variable duration and controlling the duration of such periods in accordance with outside temperature; and exercising a supervisory control on the supply of heating medium to establish a minimum temperature on at least a portion of said exchange surface.

3. In a heating system for a building, the combination of means for supplying a heating medium in recurrent periods; thermostatic means affected by outdoor temperature, and connected to vary the duration of such periods; thermostatic means subject to indoor temperature; means operated by the second-named thermostatic means at a desired minimum temperature to furnish the heating medium continuously; and time controlled means serving to adjust both thermostatic means substantially simultaneously and by related amounts.

4. In a heating system for a building, the combination of means for supplying a heating medium in recurrent periods; thermostatic means affected by outdoor temperature, and connected to vary the duration of such periods; thermostatic means subject to indoor temperature; means operated by the second-named thermostatic means at a desired maximum temperature to suspend the supply of heating medium; and time controlled means serving to adjust both thermostatic means substantially simultaneously and by related amounts.

5. In a heating system for a building, the combination of means for supplying a heating medium in recurrent periods; thermostatic means affected by outdoor temperature, and connected to vary the duration of such periods; thermostatic means responding to indoor temperature at a desired maximum and at a desired minimum; and means operated by the last-named thermostatic means in its respective maximum and minimum responses to suspend the supply of heating medium and to supply the heating medium continuously.

6. The combination of claim 5, in which time-controlled means are provided to adjust both said thermostatic means substantially simultaneously and by related amounts.

7. In a heating system the combination of a movable contact element; a movable contactor element, said contact element and contactor element being movable in coincident paths; heating medium supplying means arranged to be rendered active and inactive by interaction of said elements; yielding means biasing one of said elements in a given direction; cycling means for periodically shifting the element just mentioned in opposition to said yielding means; temperature responsive means for shifting the other of said elements; and time-controlled adjusting means interposed between said temperature responsive means and the element shifted thereby.

8. In a heating system, the combination of a movable contact element; a movable contactor element, said contact element and contactor element being movable in coincident paths; heating medium supplying means arranged to be rendered active and inactive by interaction of said elements; yielding means biasing one of said elements in a given direction; cycling means for periodically shifting the element just mentioned in opposition to said yielding means; temperature responsive means for shifting the other of said elements; fluid pressure actuated adjusting means interposed between said temperature responsive element and the element shifted thereby; and manually adjustable means for limiting the range of adjustment produced by said pressure actuated adjusting means.

9. In a heating system, the combination of a contactor element and a contact element, movable in coincident paths; means for controlling the supply of heating medium connected to be actuated by interaction of said elements; yielding means biasing one of said elements relatively to the other; temperature responsive means connected with one of said elements to change the position thereof in response to temperature; motor-actuated adjusting means interposed in said connection; a controller for said adjusting means; and two cyclically operating devices operating at different frequencies, that of higher frequency periodically moving the other of said elements in opposition to said biasing means, and the lower frequency device alternately shifting said controller in reverse direction.

10. In a heating system, the combination of a contactor element and a contact element, movable in coincident paths; means for controlling the supply of heating medium connected to be actuated by interaction of said elements; yielding means biasing one of said elements relatively to the other; temperature responsive means connected with one of said elements to change the position thereof in response to temperature; motor actuated adjusting means interposed in said connection; a controller for said adjusting means; and two cyclically operating devices operating at different frequencies, that of higher frequency periodically shifting the other of said elements in opposition to said biasing means, and the lower frequency device alternately shifting said controller in reverse directions, and serving on every other shift of such controller to shift said other element in opposition to said biasing means for a period substantially longer than that produced by operation of the device of higher frequency.

11. In a heating system, the combination of a contactor element and a contact element, movable in coincident paths; means for controlling the supply of heating medium connected to be actuated by interaction of said elements; yielding means biasing one of said elements relatively to the other; temperature responsive means subject to outdoor temperature connected with one of said elements to change the position thereof in response to such temperature; motor-actuated adjusting means interposed in said connection; a controller for said adjusting means; two cyclically operating devices operating at different frequencies, that of higher frequency periodically shifting the other of said elements in opposition to said biasing means, and the lower frequency device alternately shifting said controller in reverse directions; and thermostatic means subject to indoor temperature and responding at a high limit and a low limit to supersede said contact and contactor element in the actuation of said heating medium control means, and serving to terminate supply, at least substantially, at the high limit, and permit, at least substantially, continuous supply at the low limit.

12. In a heating system, the combination of a contactor element and a contact element, movable in coincident paths; means for controlling the supply of heating medium connected to be actuated by interaction of said elements; yielding means biasing one of said elements relatively to the other; temperature responsive means subject to outdoor temperature, connected with one of said elements to change the position thereof in response to such temperature; motor-actuated adjusting means interposed in said connection; a controller for said adjusting means; two cyclically operating devices operating at different frequencies, that of higher frequency periodically shifting the other of said elements in opposition to said biasing means, and the lower frequency device alternately shifting said controller in reverse directions and serving on every second shift of such controller to shift said other element in opposition to said biasing means for a period substantially longer than that produced by operation of the device of higher frequency; and thermostatic means subject to indoor temperature and responding at a high limit and a low limit to supersede said contacting elements in the actuation of said heating medium control means, and serving to terminate supply, at least substantially, at the high limit, and permit, at least substantially, continuous supply at the low limit.

13. In a heating system, the combination of a contactor element and a contact element, movable in coincident paths; means for controlling the supply of heating medium connected to be actuated by interaction of said elements; yielding means biasing one of said elements relatively to the other; temperature responsive means subject to outdoor temperature connected with one of said elements to change the position thereof in response to such temperature; motor-actuated adjusting means interposed in said connection; thermostatic means subject to indoor temperature and capable of responding at a chosen temperature to supersede said contacting elements in the actuation of said heating medium control means; motor-actuated adjusting means for changing the temperature of response of such thermostatic means; a controller for both said motor-actuated adjusting means; and two cyclically operating devices operating at different frequencies, that of higher frequency periodically shifting the other of said elements in opposition to said biasing means, and that of lower frequency alternately shifting said controller in reverse directions.

14. In a heating system, the combination of a contactor element and a contact element movable in coincident paths; means for controlling the supply of heating medium connected to be actuated by interaction of said elements; yielding means biasing one of said elements relatively to the other; temperature responsive means subject to outdoor temperature connected with one of said elements to change the position thereof in response to such temperature; motor-actuated adjusting means interposed in said connection; thermostatic means subject to indoor temperature and arranged to respond at a chosen temperature to supersede said contacting elements in the actuation of said medium controlling means; motor-actuated adjusting means for changing the temperature at which the thermostatic means just mentioned responds; thermostatic means serving to exercise a limiting temperature control on the device to which heating medium is supplied; motor-actuated means for placing the last-named thermostatic means into and out of operation; a controller for the three motor-actuated means; and two cyclically operating devices operating at different frequencies, that of higher frequency periodically shifting the other of said elements in opposition to said biasing means, and that of lower frequency alternately shifting said controller in reverse directions.

ARTHUR J. OTTO.